April 8, 1924.  
P. S. DONHAM  
1,489,237
CUSHION TIRE
Filed June 4, 1923
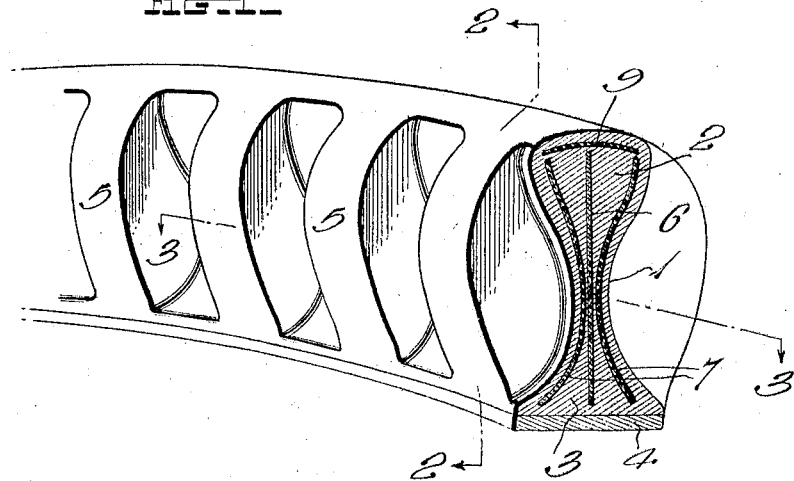
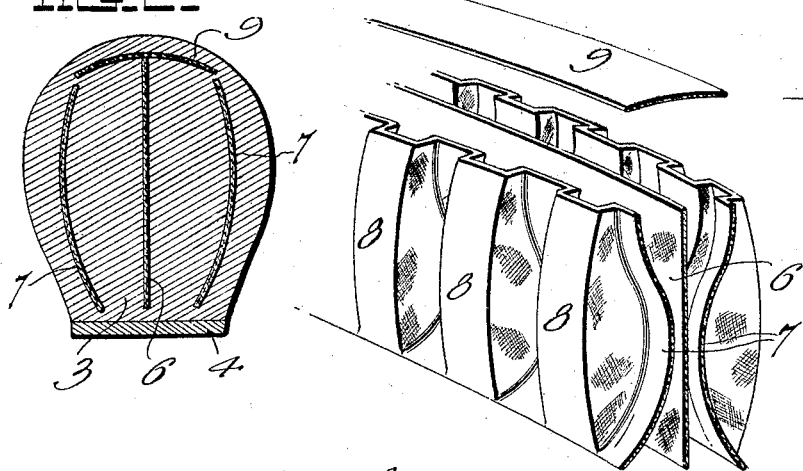
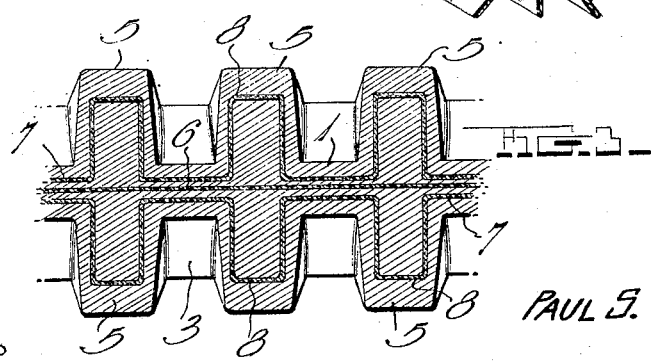
Witness
H. Woodard
Inventor
PAUL S. DONHAM
By H. R. Willson & Co.
Attorneys Patented Apr. 8, 1924.

1,489,237

UNITED STATES PATENT OFFICE.

PAUL S. DONHAM, OF CORY, INDIANA.

CUSHION TIRE.

Application filed June 4, 1923. Serial No. 643,387.

*To all whom it may concern:*

Be it known that I, PAUL S. DONHAM, a citizen of the United States, residing at Cory, in the county of Clay and State of Indiana, have invented certain new and useful Improvements in Cushion Tires; and I do declare the following to be a full, clear, and exact description of the invention, such as will enable others skilled in the art to which it appertains to make and use the same.

My invention has for its principal object to provide a novel form of cushion tire which will be exceptionally resilient and will provide for effective traction, particularly when traveling through mud, snow or the like.

A further aim of the invention is to provide a novel association of reinforcing members embedded in the tire, to impart the necessary durability thereto.

With the foregoing in view, the invention resides in the novel subject matter hereinafter described and claimed, the description being supplemented by the accompanying drawing.

Figure 1 is a sectional perspective view of a tire constructed in accordance with my invention.

Figure 2 is a transverse sectional view as indicated by line 2—2 of Fig. 1.

Figure 3 is a longitudinal sectional view on line 3—3 of Fig. 1.

Figure 4 is a disassembled perspective view showing the reinforcing means.

In constructing my invention, I may make use of any desired materials, but rubber and fabric are preferably employed, it being understood that the word "fabric" is being used in a sufficiently broad sense to cover a cord structure in which the individual cords are not interwoven as in ordinary canvas or other textile fabric.

In the accompanying drawing which illustrates the preferred form of construction, the numeral 1 designates a central circumferentially extending web whose peripheral portion is laterally thickened as indicated at 2 to provide the tread of the tire, the inner portion of the web being similarly thickened as indicated at 3 to provide the base of the tire, which may be joined if desired to a rim-engaging band 4 of any desired material.

Opposite sides of the web 1 are provided with circumferentially spaced lateral ribs 5 which are preferably disposed radially. The spaces between these ribs are preferably greater at the tread of the tire than at the inner portion of the latter so as to prevent any possibility of mud, snow and the like, lodging in said spaces. The ribs 5 have convex outer edges which extend from the base 3 to the tread 2 and merge gradually into these portions, whereas the opposite sides of the web 1, between the tread and base portions are preferably concave as shown.

The portions of the tire indicated by the reference characters 1, 2, 3 and 5 are all integrally formed of rubber or similar cushioning material and the construction shown in such as to produce excellent riding qualities, as well as unusually effective traction, particularly when the tire is forced into the roadway sufficiently to permit the lateral ribs 5 to grip.

In the preferred form of construction, a central ring of fabric 6 extends throughout the circumference of the web 1 and is embedded in the latter midway between its opposite sides, said ring being of a width to extend substantially from the tread 2 to the base 3. At opposite sides of the ring 6, I provide additional fabric rings 7 substantially co-extensive in width therewith and embedded in the web 1 near the outer surfaces thereof, circumferentially spaced portions of these rings 7 however, being bulged outwardly as indicated at 8 and embedded in the ribs 5 to reinforce the latter. The bulged portions 8 conform substantially to the curvature of the outer edges of the ribs 5 and the portions of the rings 7 between said bulged portions, are curved in about the same manner as the opposite sides of the web 1.

A breaker strip 9 is embedded in the tread 2 around the edges of the rings 6 and 7 and if desired may be attached to any or all of these rings. Furthermore, if desired, the outer rings 7 may be connected between their edges with the central ring 6.

By reinforcing the tire in the specified manner or in an equivalent way, an exceptionally strong and durable construction is provided which will effectively resist the numerous strains to which it is subjected. As there are no openings formed entirely through the tire or pockets in which gravel, sand and the like may lodge, there is no danger of acquiring sand blisters or of otherwise injuring the tire by accumulation of grit.

As excellent results may be obtained from the details disclosed, these details are preferably followed, but within the scope of the invention as claimed, numerous minor changes may be made.

I claim:

1. A cushion tire having a circumferential web laterally thickened at its periphery to form the tread of the tire and similarly thickened at its inner portion to form a rim engaging base, the sides of said web having spaced integral substantially radial ribs extending from said tread to said base, and two rings of fabric embedded in said web and of a width to extend from the base to the tread, said said rings having outwardly bulged circumferentially spaced portions embedded in said ribs.

2. A structure as specified in claim 1; together with a central ring of fabric embedded in said web between the aforesaid rings and of substantially co-extensive width, and a breaker strip embedded in said tread around the outer edges of the three rings.

3. A ribbed cushion tire reinforcement comprising a ring of fabric of a width to extend substantially from the tread to the base of a tire, said ring having circumferentially spaced substantially radial portions bulged outwardly for disposition in the ribs of the tire.

4. A ribbed cushion tire reinforcement comprising a central ring of fabric, of a width to extend substantially from the base of a tire to the tread thereof, additional rings of fabric disposed at opposite sides of said central ring and diverging with the latter from its center to its edges, said additional rings having circumferentially spaced substantially radial portions bulged outwardly for disposition in the ribs of the tire, and a breaker strip surrounding said rings.

In testimony whereof I have hereunto affixed my signature.

PAUL S. DONHAM.